United States Patent
Scrivo et al.

[11] 3,758,951
[45] Sept. 18, 1973

[54] DENTAL FIBER OPTIC ILLUMINATION SYSTEM

[75] Inventors: Leonard Scrivo, Bronxville, N.Y.; Lionel J. La Plante, S. Bridge, Mass.; Vincent A. Chumenti, Bronx, N.Y.; Gotthard George Rubin, Garfield, N.J.

[73] Assignee: Vicon Products Corp., Mamaroneck, N.Y.

[22] Filed: Nov. 8, 1971

[21] Appl. No.: 196,350

[52] U.S. Cl.............. 32/27, 32/DIG. 7, 240/41.15
[51] Int. Cl.............................................. A61c 1/10
[58] Field of Search................. 32/27, DIG. 7, 22; 240/2.18, 1 EL, 2 E, 2 MT; 350/96 B; 128/6

[56] References Cited
UNITED STATES PATENTS
3,638,013  1/1972  Keller ........................... 350/96 B
3,673,709  7/1972  Page ................................. 32/22

Primary Examiner—Antonio F. Guida
Assistant Examiner—J. Q. Lever
Attorney—Lawrence I. Lerner et al.

[57] ABSTRACT

A dental fiber optic illumination system is provided which comprises a control module for controlling the intensity of the light source, and which is adapted to be mounted on a dental tray. The use of the control module separate from the light source provides a convenient means for controlling the intensity of the light source and one which utilizes a minumim portion of the dentist's working area. There is further provided a dental handpiece hose which receives a fiber optic assembly connected to the light source. The dental handpiece hose comprises the usual conduits and a further conduit disposed between conduits for receiving a fiber optic assembly. One of the walls defining the further conduit may be made up of a pair of elongated interlocking members which permit the wall to be partially or completely opened for ready access to the further conduit.

12 Claims, 4 Drawing Figures

DENTAL FIBER OPTIC ILLUMINATION SYSTEM

FIELD OF THE INVENTION

This invention relates to fiber optic illumination systems, and particularly to dental fiber optic illumination systems.

BACKGROUND OF THE INVENTION

Dental fiber optic illumination systems are well known as evidenced by U.S. Pat. No. 2,539,828 and co-pending U.S. Pat. application No. 825,665, filed May 19, 1969 and assigned to the assignee of the present application. Such systems have achieved increasingly wide acceptance through the years because they provide light in the working area where it is most needed and, due to the fact that the light source is disposed at a distance from the patient, there is substantially no nheat associated with the light. The use of dental fiber optic systems permits increased acuity in areas which were never before clearly visualized in operative dentistry, especially in the oral posterior regions.

The actual work area that a dentist works in is relatively small. Previous fiber optic illumination systems required the addition of a fiber optic cable to contend with as well as a large receptacle containing the light source, transformer, etc. for the fiber optic assembly. Such previous systems also provided for control of the intensity of the light source by controls mounted on the receptacle for the light source.

It is an object of the present invention to provide a fiber optic illumination system which takes up a minimum portion of a dental working area and eliminates some of the causes of possible cable ientanglements.

SUMMARY OF THE INVENTION

There is provided according to the present invention a dental fiber optic illumination system comprising a receptacle, a variable intensity light source disposed within the receptacle, a control module including a manually operable control means for varying the intensity of the light source, elongated interconnecting means providing electrical connections between the control module and the light source and permitting the placement of the control module at a remote location relative to the placement of the receptacle, the electrical connections effecting desired variations of the intensity of the light source in response to operation of the manually operable control means, and a fiber optic assembly connected at one end to the receptacle and adapted to convey light from the light source via said one end to a light probe disposed at the other end of the fiber optic assembly. The fiber optic assembly may comprise a fiber optic cable attached to the control module or a fiber optic cable disposed within the dental handpiece hose, or both of the aforesaid fiber optic cables.

According to the present invention, there is further provided in a dental handpiece hose comprising an elongated hose having a plurality of elongated conduits extending axially thereof, and a dental handpiece adaptor member connected to one end of said hose for connecting said one end to a dental handpiece, the improvement that at least one of the conduits comprises an exit opening disposed substantially adjacent to the adaptor to permit a fiber optic cable to exit through the exit opening substantially adjacent to the dental handpiece, pass around the adaptor, and be attached to the dental handpiece without requiring that it pass through the adaptor. This eliminates the need for a second fiber optic cable within the dental working area while permitting the use of the dentist's original handpiece. In the preferred embodiment of the dental handpiece hose one wall of the conduit for receiving the fiber optic cable comprises an outer wall of the hose and includes elongated interlocking means which permits the wall to be opened for ready access to the conduit for the fiber optic cable for removal thereof and the closing of the said outer wall for rentention of the fiber optic cable within the conduit. Still further, a strain relief cable may be disposed in the conduit for preventing undue stresses from being applied to the fiber optic cable.

BRIEF DESCRIPTION OF THE DRAWINGS

In order that the invention may be fully understood, it will now be described with reference to the accompanying drawings, in which.

DESCRIPTION OF THE PREFERRED EMBODIMENT

Figure 1:
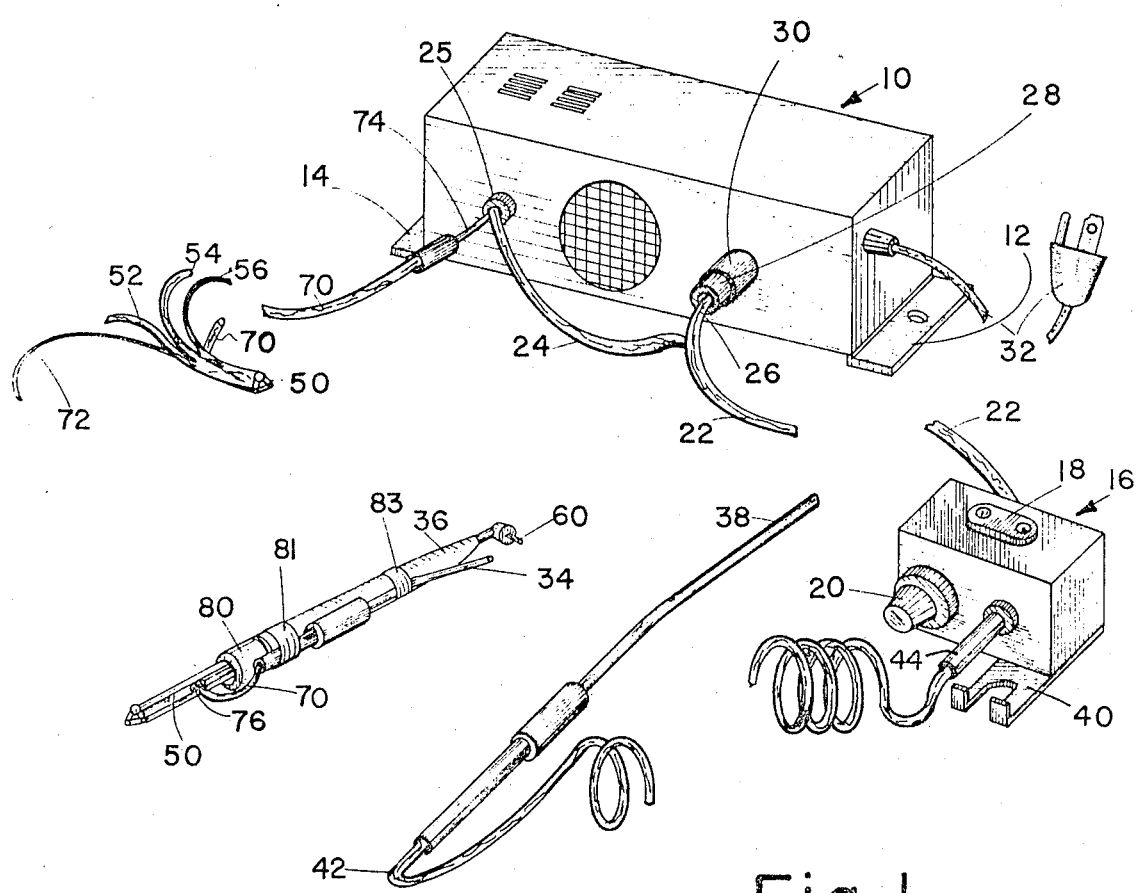
FIG. 1 is a perspective view of a dental fiber optic illumination system in accordance with the present invention.

Referring now to the drawings in which like reference numerals refer to similar parts throughout, a dental fiber optic illumination system 8 in accordance with the present invention is shown in FIG. 1. System 8 generally comprises a receptacle 10 in which there is disposed a well known variable intensity light source (not shown). Receptacle 10 has mounting flanges 12 and 14 which permit the mounting of receptacle 10 at a remote location from a dental work area, such as by attachment to the underside of a table or the like.

System 8 further generally comprises a control module 16 which includes well known mounting means 18 permitting mounting of the module on the underside of a dental tray (not shown). The mounting means 18 may be of the type manufactured by the 3-M Company under their trademark HEAD-LOCK and be adapted to mate with a similar mounting member to the one shown which would then hold the control module 16 in place. The use of such a mounting means is possible due to the small size and light weight of control module 16. Well known variable light intensity control means (not shown), such as a potentiometer, is disposed within control module 16. Control knob 20 permits manual variation of the light intensity of the light source (not shown) disposed within the receptacle 10 by means of said variable light intensity control means.

A cord assembly 22 provides the necessary electrical connections between receptacle 10 and control module 16 and also receives a fiber optic cable 24 for communicating light from the light source to control module 16. The branch 26 of cord 22 ends in an electrical plug 28 which is received in a suitable socket 30 in receptacle 10. An electric cord and plug assembly 32 provides the necessary means for supplying power to the system.

System 8 provides the dentist with two separate light probes consisting of a light probe 34 attached to the dental handpiece 36 and adapted to provide light adjacent the work area of dental handpiece 36 and a light probe 38. Light probe 38 is of the type described in previously referred to co-pending U.S. Pat. application No. 825,665, filed May 19, 1969 which can be used with a plurality of different clip-on readily removable dental instruments. A ford-like clip member 40 provides means for releasably mounting of light probe 38 on control module 16. Light probe 38 is attached to control module 16 by an extensible-retractable coiled fiber optic assembly 42 such as the one described and shown in co-pending U.S. Pat. No. 35,149, filed May 6, 1970 and assigned to the assignee of the present application. It will be noted in this regard that fiber optic cable 70 referred to hereinafter and disposed in dental handpiece hose 50 is of the extensible-retractable type disclosed in the aforesaid co-pending U.S. Pat. application No. 35,149.

Fiber optic assembly 42 terminates in a plug member 44 which provides for light communication between fiber optic cable 24 and the coiled fiber optic assembly 42 via suitable interconnecting means (not shown) which are well known in the art and are disposed within control module 16.

Light probe 34 provides the dentist with light on the work area of dental handpiece 36 without requiring the use of a separate cable containing a fiber optic assembly. Still further, the dental handpiece hose 50 in accordance with the present invention permits the installation of the present system by simply replacing the standard dental handpiece hose with hose 50. Thus, the dentist does not change his handpiece 36 and the system can be easily and more cheaply installed than systems in which special handpieces are required.

Hose 50 comprises three conduits 52, 54 and 56 for providing the usual connections between well known rotary drive means (not shown) for driving the dental drill 60. These conduits can be more clearly seen in FIG. 2. They may, for example, be used for supplying water, an exhaust, and air.

A fourth conduit 62 is disposed centrally of conduits 52, 54 and 56 and is defined by wall members 64, 66, and 68 which interconnect the conduits 52, 54 and 56. Fourth conduit 62 receives a fiber optic cable 70 and a glazed cotton strain relief cord 72. Strain relief cord 72 is secured at one end (not shown) to a dental handpiece adaptor member 80 which forms one end of hose 50 and its other end may be secured to a retractable cord assembly (not shown) for hose 50. Cord 72 functions to prevent undue stress from being applied to fiber optic cable 70 which would be the case if only hose 50 received the forces applied by the retractable assembly and which would tend to stretch hose 50. Such stretching would deleteriously affect the optical properties of fiber optic cable 70.

Fiber optic assembly 70 terminates at one end in a plug 74 which is adapted to be received in socket 24 for communicating light from the light source to light probe 34. Fiber optic cable 70 exits from hose 50 via an exit opening 76 disposed in wall 66 substantially adjacent adaptor 80. Adaptor 80 is of the type well known in the art which is screwed onto the non-working end of dental handpiece 36 and provides the necessary connections between the conduits (not shown) within dental handpiece 36 and the conduits 52, 54 and 56. It will be noted that the portion of fiber optic cable 70 which exits from the exit opening 76 has a slight loop. Light probe 34 is secured to dental handpiece 36 by aluminum tape at 81 and 83. The provision of the slight loop permits dental handpiece 36 to be disconnected from adaptor 80 for maintenance thereof without requiring that light probe 34 be disconnected therefrom.

Figures 2, 3, 4:
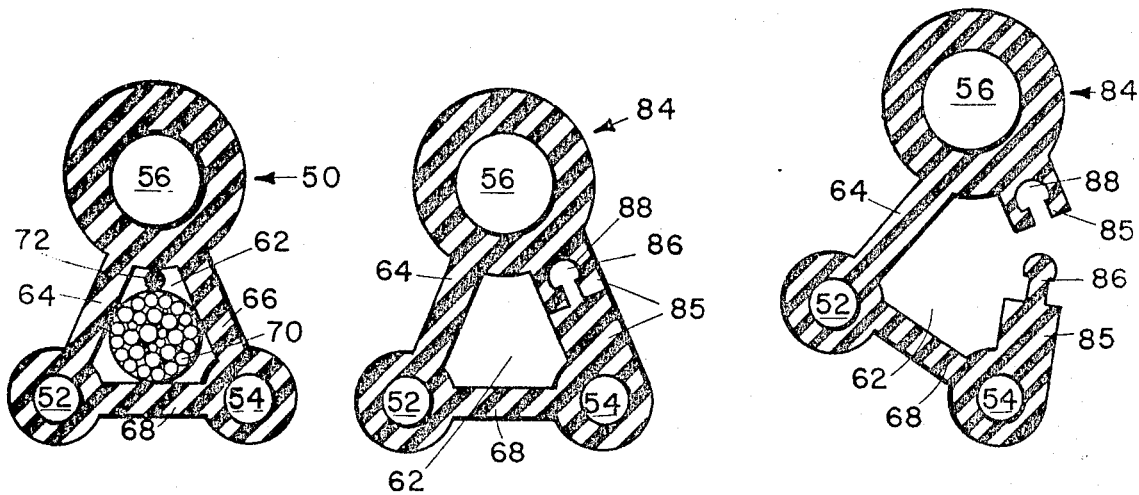
FIG. 2 is a cross-sectional view of a first embodiment of a dental handpiece hose in accordance with the present invention.
FIG. 3 is a cross-sectional view of a second embodiment of a dental handpiece hose in accordance with the present invention.
FIG. 4 is another cross-sectional view of the second embodiment of a dental handpiece hose in accordance with the present invention.

A second embodiment of a dental handpiece hose 84 in accordance with the present invention is shown in FIGS. 3 and 4. Hose 84 differs from hose 50 only in that instead of a solid wall member 66 there is provided a wall member 85 comprising elongated interlocking members 86 and 88 which can be pulled apart to fully open conduit 62 as shown in FIG. 4 for removal of a fiber optic cable therefrom or for other purposes requiring ready access to conduit 62. When the interlocking members 86 and 88 are in the locked position shown in FIG. 3, conduit 62 is completely closed concealing any members contained therein.

It is believed to be clear from the above that the present invention provides a dental fiber optic illumination system in which a minimum of the dentist's working area is occupied. Further, a small control module 16 can be readily mounted on the dental tray to provide an easily accessible means for varying the light intensity of the light probes 34 and 38.

Thus, the bulk of the variable light intensity control means, such as a transformer, etc. are disposed within receptacle 10 while only a potentiometer or the like is disposed within control module 16.

The present invention further provides a dental fiber optic system which can be simply installed in present dental equipment and in which a separate fiber optic cable is not required to provide light adjacent the dental handpiece while permitting the dentist's original handpiece can be used. Further, strain relief means prevent undue stresses from being applied to the fiber optic cable even when the hose 50 is attached to an automatically retractable cord assembly.

It is to be understood that the present description has been by way of example only and is not intended as a limitation to the scope of the invention as defined by the appended claims.

What we claim is:

1. A dental fiber optic illumination system comprising a receptacle, a variable intensity light source disposed within said receptacle, a control module including a manually operable control means for varying the intensity of said light source, elongated interconnecting means providing electrical connections between said control module and said light source and permitting the placement of said control module at a remote location relative to the placement of said receptacle, said electrical connections effecting desired variations of the intensity of said light source in response to operation of said manually operable control means, a fiber optic assembly comprising a fiber optics cable connected at one end to said receptacle and adapted to convey light from said light source via said one end to the other end of said fiber optic assembly, a dental handpiece having rotary drive means disposed at its work end, remote drive means disposed at a location remote from said dental handpiece and adapted to drive said rotary drive means, a dental handpiece hose comprising conduits connecting said remote drive means to said rotary drive means for driving of said rotary drive means by said remote drive means, a further conduit in which a substantial portion of said fiber optic cable is disposed, said fiber optic cable exiting from said dental handpiece hose substantially adjacent the non-working end of said dental handpiece, said fiber optic cable comprising a light probe at its end which exits adjacent said dental handpiece, and said fiber optic assembly further comprises means for attaching said light probe to said dental handpiece so that any light emanating therefrom will illuminate the work area of said rotary drive means.

2. A dental fiber optic illumination system comprising a receptacle, a variable intensity light source disposed within said receptacle, a control module including a manually operable control means for varying the intensity of said light source, elongated interconnecting means providing electrical connections between said control module and said light source and permitting the placement of said control module at a remote location relative to the placement of said receptacle, said electrical connections effecting desired variations of the intensity of said light source in response to operation of said manually operable control means, a fiber optic assembly comprising a fiber optics cable connected at one end to said receptacle and adapted to convey light from said light source via said one end to the other end of said fiber optic assembly, a dental handpiece having rotary drive means disposed at its work end, remote drive means disposed at a location remote from said dental handpiece and adapted to drive said rotary drive means and a dental handpiece hose comprising at least four conduits which include conduits connecting said remote drive means to said rotary drive means for driving of said rotary driving means by said remote drive means, and a further conduit in which at least a substantial portion of said fiber optic cable is disposed, said further conduit being disposed centrally of said other conduits.

3. A dental fiber optic illumination system comprising a receptacle, a variable intensity light source disposed within said receptacle, a control module including a manually operable control means for varying the intensity of said light source, elongated interconnecting means providing electrical connections between said control module and said light source and permitting the placement of said control module at a remote location relative to the placement of said receptacle, said electrical connections effecting desired variations of the intensity of said light source in response to operation of said manually operable control means, a fiber optic assembly comprising a fiber optics cable connected at one end to said receptacle and adapted to convey light from said light source via said one end to the other end of said fiber optic assembly, a dental handpiece having rotary drive means disposed at its work end, remote drive means disposed at a location remote from said dental handpiece and adapted to drive said rotary drive means, a dental handpiece hose comprising conduits connecting said remote drive means to said rotary drive means for driving of said rotary drive means by said remote drive means, and a further conduit in which at least a substantial portion of said fiber optic cable is disposed, said dental handpiece hose including at least one elongated wall member defining an outer portion of said hose and a wall of said further conduit, and said elongated wall member comprises elongated interlocking means permitting the opening of said elongated wall member for ready access to said further conduit and removal of said fiber optic cable therefrom and the closing of said elongated wall member for retention of said fiber optic cable within said further conduit.

4. A dental handpiece hose comprising an elongated hose having at least four elongated conduits extending axially thereof, one of said elongated conduits being adapted to receive an elongated member and is disposed centrally of said other conduits.

5. A dental handpiece hose according to claim 4, wherein one of said conduits is defined by at least one wall member which also defines an outer wall of said hose, and said wall member comprises elongated interlocking means permitting the opening of said wall member for ready access to said one conduit and removal of said elongated member therefrom and the closing of said wall member for retention of said elongated member within said one conduit.

6. A dental handpiece hose according to claim 4, further comprising a dental handpiece adaptor member connected at one end of said hose for connecting said end to a dental handpiece, and a stress relief cord disposed within at least one of said conduits and attached at one end to said adaptor and extending at its other end out of the opposite end of said conduit.

7. A system according to claim 1, wherein said fiber optic assembly comprises a first fiber optic cable connected at one end to said control module, the other end of said first fiber optic cable being the other end of said fiber optic assembly, the other end of said first fiber optic cable terminating in a light probe, a second fiber optic cable disposed within said elongated interconnecting means and providing light communication between said light source and said control module, the end of said second fiber optic cable communicating with said light source being the said one end of said fiber optic assembly, and means interconnecting said first and second cables within said control module for light communication between said first and second fiber optic cables.

8. A system according to claim 7, wherein said control module includes a forked holding member for releaseably holding said light probe.

9. A system according to claim 1, wherein said control module includes mounting means for mounting of said control module on a dental tray.

10. A system according to claim 2, wherein said dental handpiece hose comprises at least three wall members which at least partially define said further conduit, and each said wall member connects one of the other conduits to another of the other conduits.

11. A system according to claim 10, wherein at least one of said wall members defines an outer wall of said dental handpiece hose, and said one wall comprises elongated interlocking means permitting the opening of said one wall for ready access to said further conduit and removal of said fiber optic cable therefrom and the closing of said one wall for retention of said fiber optic cable within said further conduit.

12. A system according to claim 2, further comprising a stress relief cord disposed within said further conduit and attached at one end to said hose substantially adjacent the end thereof and adapted to be connected to said dental handpiece, the other end of said cord extending out of the opposite end of said further conduit.

* * * * *